(12) United States Patent
    Su

(10) Patent No.: US 10,326,310 B2
(45) Date of Patent:      Jun. 18, 2019

(54) HIGH-EFFICIENCY ELECTRICAL ENERGY TRANSMITTING END AND WIRELESS ELECTRICAL ENERGY TRANSMISSION DEVICE

(71) Applicant: NINGBO WEIE ELECTRONIC TECHNOLOGY CO., LTD., Zhenhai, Ningbo (CN)

(72) Inventor: Hengyi Su, Ningbo (CN)

(73) Assignee: Ningbo WeiE Electronic Technology Co., Ltd., Zhenhai, Ningbo (CN)

( * ) Notice: Subject to any disclaimer, the term of this patent is extended or adjusted under 35 U.S.C. 154(b) by 275 days.

(21) Appl. No.: 15/277,071

(22) Filed: Sep. 27, 2016

(65) Prior Publication Data

US 2017/0093219 A1     Mar. 30, 2017

(30) Foreign Application Priority Data

Sep. 27, 2015   (CN) .......................... 2015 1 0624656

(51) Int. Cl.
    *H02J 50/12*       (2016.01)
    *H02J 7/02*        (2016.01)
(52) U.S. Cl.
    CPC .............. *H02J 50/12* (2016.02); *H02J 7/025* (2013.01)
(58) Field of Classification Search
    CPC .................................. H02J 50/12; H02J 7/025
    See application file for complete search history.

(56) References Cited

U.S. PATENT DOCUMENTS

| 2011/0080056 | A1* | 4/2011 | Low ........................ | H02J 5/005 307/104 |
|---|---|---|---|---|
| 2016/0056639 | A1* | 2/2016 | Mao ........................ | H02J 50/80 307/104 |
| 2016/0094046 | A1* | 3/2016 | Kato ........................ | H02J 5/005 307/104 |
| 2017/0040844 | A1* | 2/2017 | Su ............................ | H02J 50/12 |
| 2017/0317529 | A1* | 11/2017 | Smith ..................... | H02J 50/10 |

* cited by examiner

*Primary Examiner* — Jared Fureman
*Assistant Examiner* — Michael J Warmflash
(74) *Attorney, Agent, or Firm* — Charles C. Achkar; Ostrolenk Faber LLP.

(57) ABSTRACT

A high-efficiency electrical energy transmitting end and a wireless electrical energy transmission device are provided. A soft-switching control circuit controls the voltage waveform between two ends of a switching device of an inverter circuit. During disconnection of the switching device, a voltage waveform between the drain electrode and the source electrode is a waveform in the form of a fundamental wave superimposed with a third harmonic, enabling the switching device to be turned on at zero voltage to decrease the switching loss. Through a current regulation circuit, the primary transmitting current is controlled to have constant frequency and constant amplitude to ensure that the primary transmitting energy won't be affected by the changes of the coupling and load and to enhance the transmission efficiency. The transmission efficiency of the wireless electrical energy transmission device of the present invention is high and the reliability is better.

9 Claims, 2 Drawing Sheets

HIGH-EFFICIENCY ELECTRICAL ENERGY TRANSMITTING END AND WIRELESS ELECTRICAL ENERGY TRANSMISSION DEVICE

CROSS REFERENCE TO RELATED APPLICATIONS

The present application claims the benefit of priority of Chinese Application No. 201510624656.5, filed Sep. 27, 2015 the subject matter of which is incorporated by reference.

FIELD OF THE INVENTION

The present invention relates to an electrical energy transmission field, and more particularly to a high-efficiency electrical energy transmitting end and a wireless electrical energy transmission device.

BACKGROUND OF THE INVENTION

In general, a wireless electrical energy transmission device includes an electrical energy transmitting end and an electrical energy receiving end to transmit energy by means of electromagnetic induction or magnetic resonance. The electrical energy transmitting end includes an inverter and a transmitting coil. The invertor receives DC voltage to generate AC voltage. The transmitting coil receives an alternating field with a frequency $\omega_0$ generated by AC voltage. The receiving coil of the electrical energy receiving end is coupled with the alternating magnetic field to generate alternating voltage $V_{sin\ (\omega 0)}$ with the frequency $\omega_0$. Generally, the lower the frequency of the alternating field is, the shorter the distance of the electrical energy transmission is. Therefore, in order to increase the distance of the wireless electrical energy transmission, the frequency of the alternating field must be increased. According to wireless charging standards, such as Qi and PMA wireless charging standards, in an electromagnetic induction wireless electrical energy transmission system, the frequency of the alternating magnetic field is in the range of 100 kHz-500 kHz and the distance of the electrical energy transmission distance is usually one centimeter or less; according to A4WP wireless charging standards, in a magnetic resonance wireless electrical energy transmission system, if the frequency of the alternating magnetic field is 6.78 MHz, the distance of the corresponding electrical energy transmission is up to several centimeters.

In order to increase the distance of transmission, it usually uses magnetic resonance wireless electrical energy transmission and generates an alternating magnetic field with the frequency of 6.78 MHz. The corresponding switching component of an inverter works at the frequency of 6.78 MHz. When the switching component works at the frequency of 6.78 MHz, the switching component will have a large switching loss. This may shorten the service life of the switching component greatly. In order to reduce the loss, it needs the soft-switching technology (ZVS) to lower the loss of the switching component.

Furthermore, an inverter circuit in a half-bridge or full-bridge configuration needs two or more switching components to work together. But at such a high operating frequency of 6.78 MHz, it is difficult to precisely control the dead-time between a plurality of switching devices. The switching devices may be wrongly connected or disconnected at the same time, which reduces the safety and reliability of the circuit.

SUMMARY OF THE INVENTION

In view of the problems of the prior art, the primary object of the present invention is to provide a high-efficiency electrical energy transmitting end and a wireless electrical energy transmission device. A soft-switching control circuit controls a switching device of an inverter circuit to be turned on at zero voltage so as to decrease the switching loss. The frequency and amplitude of the primary transmitting current is controlled to ensure that the primary transmitting energy won't be affected by the change of the coupling and the change of the load so as to enhance the transmission efficiency.

According to one aspect of the present invention, a high-efficiency electrical energy transmitting end used for transmitting energy to a spaced electrical receiving end is provided. The electrical energy transmitting end comprises an inverter circuit, a soft-switching control circuit, a current regulation circuit, and a primary transmitting part. The inverter circuit receives a DC (direct current) input power supply to output alternating voltage with a preset frequency. The soft-switching control circuit is connected between the DC input power supply and the inverter circuit for controlling the voltage between two power ends of a switching device of the inverter circuit. The current regulation circuit receives the alternating voltage outputted from the inverter circuit to generate an alternating current signal with constant frequency and constant amplitude. The primary transmitting part comprises a primary transmitting coil. The primary transmitting coil is used for receiving the alternating voltage to generate an alternating magnetic field to transmit energy to the electrical energy receiving end. Wherein, the soft-switching control circuit controls the voltage between the two power ends of the switching device of the inverter circuit. During disconnection of the switching device, a voltage waveform between the two power ends of the switching device is a waveform in the form a fundamental wave superimposed with a third harmonic, such that when the switching device is turned on, the voltage between the two power ends of the switching device is lowered to zero.

Furthermore, the inverter circuit comprises a field effect transistor. The field effect transistor is controlled by a clock signal to be in an open state or a closed state. When the clock signal is in an effective state, the field effect transistor is connected. When the clock signal is in a null state, the field effect transistor is disconnected.

Furthermore, the soft-switching control circuit comprises a first inductance, a second inductance, a first capacitor, and a second capacitor. The first inductance is connected between one end of the DC input power supply and one of the power ends of the switching device of the inverter circuit. The second inductance is connected with the first capacitor in series and then connected with the first inductance in parallel. The second capacitor is parasitic capacitance of the transistor.

Preferably, the first inductance, the second inductance, and the first capacitor are integrated into a module.

Furthermore, the soft-switching control circuit comprises a first inductance, a second inductance, a first capacitor, and a third capacitor. The first inductance is connected between one end of the DC input power source and one of the power ends of the switching device of the inverter circuit. The second inductance is connected with the first capacitor in series and then connected with the first inductance in parallel. The third capacitor is connected with two ends of the first inductance in parallel.

Preferably, the first inductance, the second inductance, the first capacitor, and the third capacitor are integrated into a module.

Furthermore, the soft-switching control circuit further comprises a fourth capacitor. The fourth capacitor is connected between two power ends of the field effect transistor in parallel.

Furthermore, the current regulation circuit comprises a resonant circuit composed of a third inductance and a fifth capacitor. A first end of the third inductance is connected with a positive output end of the inverter circuit, and a second end of the third inductance is connected with a first end of the primary transmitting coil. A first end of the fifth capacitor is connected with the second end of the third inductance, and a second end of the fifth capacitor is connected with a negative output end of the inverter circuit. A resonant frequency of the third inductance and the fifth capacitor is the same as the preset frequency. A signal of a point of common coupling of the third inductance and the fifth inductance is as the alternating current signal.

Preferably, the electrical energy transmitting end further comprises a primary resonant capacitor. A resonant frequency of the primary resonant capacitor and the primary transmitting coil is the same as the preset frequency.

According to another aspect of the present invention, a wireless electrical energy transmission device is provided. The wireless electrical energy transmission device comprises an electrical energy transmitting end and an electrical energy receiving end which are spaced apart from each other. The electrical energy transmitting end is the aforesaid electrical energy transmitting end. The electrical energy receiving end comprises a secondary receiving coil and a rectifier and filter circuit. The secondary receiving coil inducts the alternating magnetic field generated by the primary transmitting coil to get corresponding alternating voltage. The rectifier and filter circuit converts the alternating voltage to applicable DC (direct current) voltage for supplying an output load.

The aforesaid high-efficiency electrical energy transmitting end and the wireless electrical energy transmission device have the soft-switching control circuit to control the voltage waveform of the two ends of the switching device of the invertor circuit. During disconnection of the switching device, the voltage waveform between the drain electrode and the source electrode is a waveform in the form of a fundamental wave superimposed with a third harmonic so that the switching device can be turned on at zero voltage to decrease the switching loss. The present invention has the current regulation circuit for controlling the primary transmitting current with constant frequency and constant amplitude, not be affected by the change of the coupling and the change of the load to improve the transmission efficiency of energy. Furthermore, the invertor circuit of the present invention uses a single switching component to generate alternating voltage with high frequency. The components are few and the cost is low. Finally, the soft-switching control circuit can lower the voltage stress of the first capacitor and the second capacitor. The demand for pressure tolerance of the capacitor is low to save the cost of the circuit and improve the reliability of the system safety.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
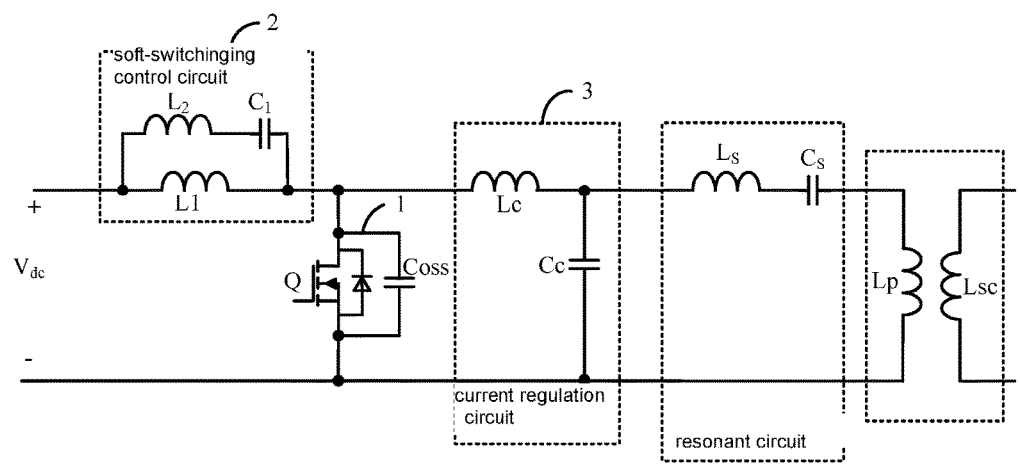
FIG. 1 is a circuit diagram of a wireless electrical energy transmission device in accordance with a first embodiment of the present invention.
Figure 5:
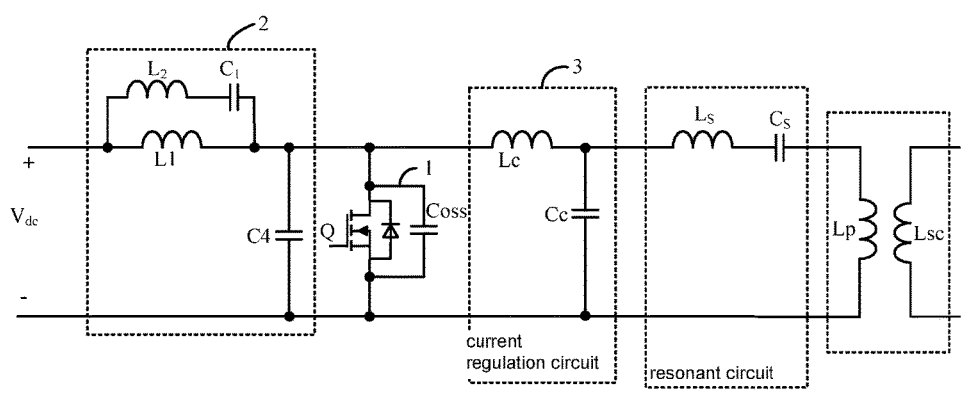
FIG. 5 is a circuit diagram of a wireless electrical energy transmission device in accordance with a third embodiment of the present invention.

FIG. 1 is a circuit diagram of a wireless electrical energy transmission device in accordance with a first embodiment of the present invention. The wireless electrical energy transmission device includes an electrical energy transmitting end and an electrical energy receiving end which are spaced apart from each other. In this embodiment, the electrical energy transmitting end includes an inverter circuit 1, a soft-switching control circuit 2, a current regulation circuit 3, and a primary transmitting part. The primary transmitting part includes a primary transmitting coil Ls, a resonant capacitor Cs, and a primary winding of a transformer. The primary transmitting coil and the resonant capacitor constitutes a primary resonant circuit. As shown in FIG. 5, the electrical energy receiving end includes a secondary receiving coil Lsc and a rectifier and filter circuit. The secondary receiving coil inducts an alternating magnetic field generated by the primary transmitting coil to get corresponding alternating voltage. The rectifier and filter circuit converts the alternating voltage to applicable DC (direct current) voltage for supplying an output load.

Specifically, the inverter circuit 1 receives a DC input power supply Vdc to output alternating voltage with a preset frequency. In this embodiment, the inverter circuit includes a field effect transistor Q (such as, an N-MOSFET). The field effect transistor is controlled by a clock signal to be in an open state or a closed state. When the clock signal is in an effective state (high level), the field effect transistor is connected. When the clock signal is in a null state (low level), the field effect transistor is disconnected. The duty cycle of the clock signal can be set according to the demand. In this embodiment, it is 0.5. Wherein, the preset frequency is the same as the system working frequency $\omega_0$ of the wireless electrical energy transmission device. The resonant frequency of the resonant capacitor Cs and the primary transmitting coil Ls is the same as the preset frequency $\omega_0$, enabling the primary and second mechanisms of the wireless electrical energy transmission device to have a good coupling. The transmission efficiency is high.

The soft-switching control circuit 2 is connected between the DC input power supply and the inverter circuit 1 for controlling the voltage between two power ends of a switching device of the inverter circuit 1. Specifically, the soft-switching control circuit 2 controls the voltage of the drain electrode and the source electrode of the transistor Q. During disconnection of the transistor Q, the voltage waveform between two power ends of the transistor Q is in the form of a fundamental wave superimposed with a third harmonic. When the transistor Q is connected, the voltage of the two power ends of the transistor Q is lowered to zero. Furthermore, the soft-switching control circuit 2 may include a first inductance L1, a second inductance L2, a first capacitor C1, and a second capacitor. The first inductance L1 is connected between one end of the DC input power supply and one of the power ends of the switching device of the inverter circuit. Specifically, the first inductance L1 is connected between the positive end of the DC input power supply and the drain electrode of the transistor Q, as known by the person skilled in this field. The first inductance L1 may be connected between the negative end of the DC input power supply and the source electrode of the transistor Q. The second inductance L2 is connected with the first capacitor C1 in series and then connected with the first inductance L1 in parallel. In this embodiment, the second capacitor is parasitic capacitance Coss of the transistor Q. The parasitic capacitance Coss is connected between the drain electrode and the source electrode of the transistor. The first inductance, the second inductance, and the first capacitor may be integrated into a module as an independent passive module connected to the circuit. The passive module has only one input end and only one output end to be connected conveniently. For example, the passive module as a whole is connected between the positive end of the DC input power supply and the drain electrode of the transistor Q or between the negative end of the DC input power supply and the source electrode of the transistor Q.

Figure 2:
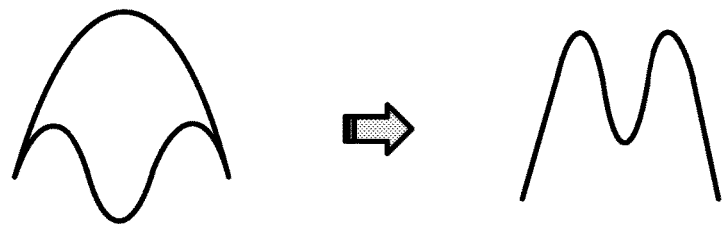
FIG. 2 is a first working waveform in accordance with the first embodiment of the present invention.
Figure 3:
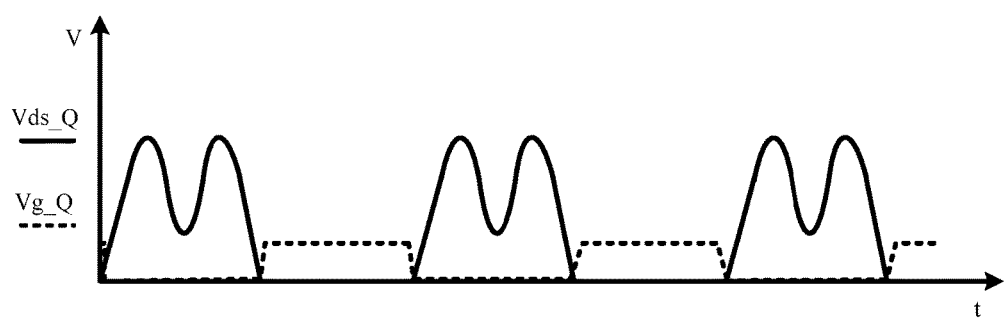
FIG. 3 is a second working waveform in accordance with the first embodiment of the present invention.

FIG. 2 and FIG. 3 illustrate the working waveform. Through the first inductance L1, the second inductance L2, and the capacitance of the first capacitor C1 of the soft-switching control circuit 2 as well as the parasitic capacitance, in the vicinity of the fundamental wave of the voltage waveform between the drain electrode and the source electrode of the transistor Q, the second inductance L2 may approximate low impedance. After the first capacitor C1 is connected with the parasitic capacitance Coss in parallel, it is connected with the first inductance L1 in parallel to resonate. The equivalent impedance is high impedance in the vicinity of the fundamental switching frequency. In the vicinity of the third harmonic, the first capacitor C1 may approximate low impedance. After the first inductance L1 is connected with the second inductance L2 in parallel, it is connected with the parasitic capacitance Coss in parallel to resonate. Similarly, the equivalent impedance is high impedance in the vicinity of the third harmonic. In the vicinity of the second harmonic, the second inductance L2 is connected with the first capacitor C1 in series to resonate, forming low impedance. In this way, during disconnection of the transistor Q, the two ends of the transistor Q will form a waveform in the form of a fundamental wave superimposed with a third harmonic. As shown in FIG. 2, the peak voltage Vds_Q of the two ends of the transistor Q will be lowered. The requirements for the components of the circuit are also lowered accordingly. For example, a low voltage-rating component can be used. This can reduce the circuit cost. The conduction resistance of the low voltage-rating component is less to decrease the conduction loss of the component. Furthermore, because the voltage Vds_Q between the two ends of the transistor Q is reduced continuously, when the clock signal Vg_Q of the transistor is controlled from the null state (low level) to the effective state (high level), the voltage Vds_Q between the two ends of the transistor Q is lowered to zero. The transistor Q is connected at zero voltage, so that the transistor doesn't have switching loss. The specific waveform is shown in FIG. 3.

In this embodiment, the current regulation circuit 3 receives the alternating voltage outputted from the inverter circuit to generate an alternating current signal with constant frequency and constant amplitude. Specifically, the current regulation circuit 3 includes a resonant circuit composed of a third inductance Lc and a fifth capacitor Cc. A first end of the third inductance Lc is connected with the positive output end of the inverter circuit. A second end of the third inductance Lc is connected with the first end of the primary transmitting coil Ls. A first end of the fifth capacitor Cc is connected with the second end of the third inductance Lc. A second end of the fifth capacitor Cc is connected with the negative output end of the inverter circuit. The resonant frequency of the third inductance and the fifth capacitor is the same as the preset frequency. The signal of the point of common coupling (PCC) of the third inductance and the fifth inductance is as the alternating current signal. As known by the person skilled in this field, the structure of the current regulation circuit is not limited thereto.

When resonant frequency of the third inductance and the fifth capacitor is the same as the preset frequency $\omega_0$, the amplitude of the alternating current signal is dependent on the impedance of the third inductance under the system working frequency and the amplitude of the power supply. Therefore, when the impedance of the third inductance and the amplitude of the power supply are determined, the alternating current signal has constant frequency and constant amplitude. The constant frequency is the same as the preset frequency $\omega_0$. As shown in FIG. 1, the alternating current signal is the current signal of the primary transmitting coil. When the primary transmitting coil passes the alternating current signal with constant frequency and constant amplitude, it will generate an alternating magnetic field with constant frequency and constant amplitude in the vicinity of the primary coil so that the secondary electrical energy receiving end can receive stable electrical energy which won't change because of the change of the coupling of the primary and secondary coils or the change of the load to ensure the transmission efficiency of energy.

Through the aforesaid wireless electrical energy transmission device, the electrical energy transmitting end has the inverter circuit composed of the transistor to achieve conversion of direct current and alternating current. The components are few and the cost is low. The soft-switching control circuit controls the transistor to be turned on at zero voltage. The switching loss is low. The first inductance, the second inductance, and the first capacitor of the soft-switching control circuit of the present invention can be integrated into a module as an independent passive module connected between the input power supply and the switching device. Besides, the electrical energy transmitting end of the present invention is provided with the current regulation circuit to regulate the current of the primary coil for the current signal with constant frequency and constant amplitude. The primary transmitting magnetic field is stable, not being affected by the change of the coupling of the primary and secondary coils or the change of the load. The transmission efficiency of the system is improved. Finally, in order to ensure the primary and second coils are coupled with maximum efficiency, the present invention has the resonant capacitor and the primary transmitting coil to proceed with resonant transmission, enabling the primary resonant frequency to be the same as the system working frequency.

Figure 4:
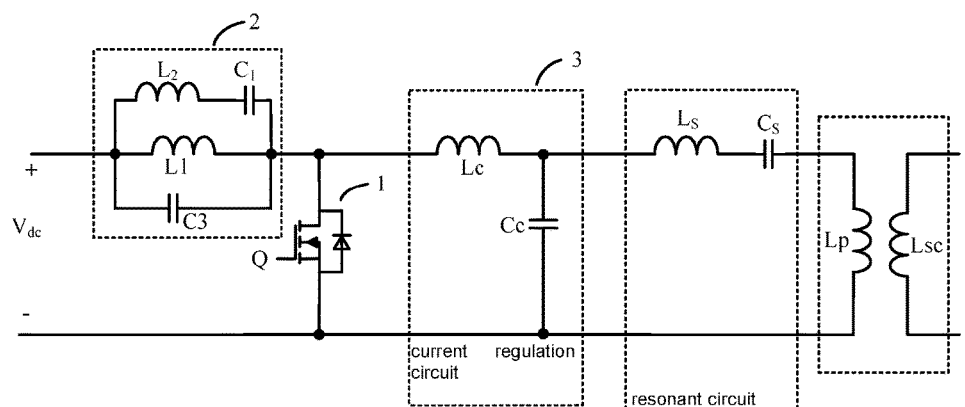
FIG. 4 is a circuit diagram of a wireless electrical energy transmission device in accordance with a second embodiment of the present invention.

FIG. 4 is a circuit diagram of a wireless electrical energy transmission device in accordance with a second embodiment of the present invention. The inverter circuit 1 and the current regulation circuit 3 of the electrical energy transmitting end and the primary transmitting part are the same as the first embodiment. The difference between the first and second embodiments is that the soft-switching control circuit 2 further includes a third capacitor C3. The third capacitor C3 and the two ends of the first inductance L1 are connected in parallel.

Similarly, through the capacitances of the first inductance L1, the second inductance L2, the first capacitor C1 and the third capacitor C3, the soft-switching control circuit generates lower impedance at the second harmonic and high impedance at the fundamental wave and the third harmonic of the voltage waveform between the drain electrode and the source electrode of the transistor Q. Therefore, during disconnection of the transistor Q, the voltage waveform between the two ends of the transistor Q is a waveform in the form of a fundamental wave superimposed with a third harmonic, so that the transistor Q can be connected at zero voltage.

In this embodiment, the first inductance L1, the second inductance L2, the first capacitor C1, and the third capacitor C3 can be integrated into a module as an independent passive module connected to the circuit.

Similarly, the second embodiment has the effect of high efficiency and low loss same as the first embodiment. Besides, the first capacitor C1 and the third capacitor C3 of this embodiment don't have direct current offset, which can lower the voltage stress of the capacitors effectively. A low pressure-tolerant capacitor can be chosen to save the cost of the capacitor.

FIG. 5 is a circuit diagram of a wireless electrical energy transmission device in accordance with a third embodiment of the present invention. The third embodiment is based on the first embodiment and further includes a fourth capacitor C4. The fourth capacitor C4 is connected in parallel between the drain electrode and the source electrode of the transistor Q.

When the parasitic capacitance of the transistor Q is less, the inductance and the capacitance of the soft-switching control circuit and the parasitic capacitance cannot jointly form the waveform in the form a fundamental wave superimposed with a third harmonic. The two ends of the transistor must be connected with a capacitor in parallel. As shown in FIG. 5, through the capacitances of the first inductance L1, the second inductance L2, the first capacitor C1, and the fourth capacitor C4, during disconnection of the transistor Q, the two ends of the transistor Q form a waveform in the form a fundamental wave superimposed with a third harmonic so that the transistor Q can be connected at zero voltage.

Thereby, the high-efficiency electrical energy transmitting end and the wireless electrical energy transmission device of the present invention have the soft-switching control circuit to control the voltage waveform of the two ends of the switching device of the invertor circuit. During disconnection of the switching device, the voltage waveform between the drain electrode and the source electrode is a waveform in the form a fundamental wave superimposed with a third harmonic so that the switching device can be connected at zero voltage. The switching loss is less. The passive components of the soft-switching control circuit can be integrated into a module as an independent module connected to the circuit. The present invention has the current regulation circuit for controlling the primary transmitting current to be the current with constant frequency and constant amplitude, not be affected by the change of the coupling and the change of the load. The wireless electrical energy transmission device of the present invention improves the transmission efficiency and the reliability of the system safety greatly.

The aforesaid preferred embodiments of the present invention describe the details of the high-efficiency electrical energy transmitting end and the wireless electrical energy transmission device of the present invention. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A high-efficiency electrical energy transmitting end, used for transmitting energy to a spaced electrical receiving end, comprising an inverter circuit, a soft-switching control circuit, and a primary transmitting part;

the inverter circuit receiving a direct current input power supply to output alternating voltage with a preset frequency;

the soft-switching control circuit being connected between the direct current input power supply and the inverter circuit for controlling voltage between two power ends of a switching device of the inverter circuit;

the primary transmitting part comprising a primary transmitting coil, the primary transmitting coil being used for receiving the alternating voltage to generate an alternating magnetic field to transmit energy to the electrical energy receiving end;

wherein the soft-switching control circuit controls the voltage between the two power ends of the switching device of the inverter circuit, during disconnection of the switching device, a voltage waveform between the two power ends of the switching device is a waveform in a form of a fundamental wave superimposed with a third harmonic, such that when the switching device is connected, the voltage between the two power ends of the switching device is lowered to zero;

wherein the inverter circuit comprises a field effect transistor, the field effect transistor is controlled by a clock signal to be in an open state or a closed state, when the clock signal is in an effective state, the field effect transistor is connected, when the clock signal is in a null state, the field effect transistor is disconnected;

wherein the soft-switching control circuit comprises a first inductance, a second inductance, a first capacitor, and a second capacitor;

wherein the first inductance is connected between one end of the direct current input power supply and one of the power ends of the switching device of the inverter circuit;

wherein the second inductance is connected with the first capacitor in series and then connected with the first inductance in parallel;

wherein the second capacitor is parasitic capacitance of the transistor.

2. The high-efficiency electrical energy transmitting end as claimed in claim 1, wherein the first inductance, the second inductance, and the first capacitor are integrated into a module.

3. The high-efficiency electrical energy transmitting end as claimed in claim 1, wherein the soft-switching control circuit further comprises a fourth capacitor, and the fourth capacitor is connected between two power ends of the field effect transistor in parallel.

4. The high-efficiency electrical energy transmitting end as claimed in claim 1, further comprising a current regulation circuit, the current regulation circuit receiving the alternating voltage outputted from the inverter circuit to generate an alternating current signal with constant frequency and constant amplitude.

5. The high-efficiency electrical energy transmitting end as claimed in claim 4, wherein the current regulation circuit comprises a resonant circuit composed of a third inductance and a fifth capacitor;
   wherein a first end of the third inductance is connected with a positive output end of the inverter circuit, and a second end of the third inductance is connected with a first end of the primary transmitting coil;
   wherein a first end of the fifth capacitor is connected with the second end of the third inductance, and a second end of the fifth capacitor is connected with a negative output end of the inverter circuit;
   wherein a resonant frequency of the third inductance and the fifth capacitor is the same as the preset frequency, and a signal of a point of common coupling of the third inductance and the fifth inductance is as the alternating current signal.

6. The high-efficiency electrical energy transmitting end as claimed in claim 1, further comprising a primary resonant capacitor, a resonant frequency of the primary resonant capacitor and the primary transmitting coil is the same as the preset frequency.

7. A wireless electrical energy transmission device, comprising an electrical energy transmitting end and an electrical energy receiving end which are spaced apart from each other;
   wherein the electrical energy transmitting end is as claimed in claim 1;
   wherein the electrical energy receiving end comprises a secondary receiving coil and a rectifier and filter circuit, the secondary receiving coil inducts the alternating magnetic field generated by the primary transmitting coil to get corresponding alternating voltage, and the rectifier and filter circuit converts the alternating voltage to applicable direct current voltage for supplying an output load.

8. A high-efficiency electrical energy transmitting end, used for transmitting energy to a spaced electrical receiving end, comprising an inverter circuit, a soft-switching control circuit, and a primary transmitting part;
   the inverter circuit receiving a direct current input power supply to output alternating voltage with a preset frequency;
   the soft-switching control circuit being connected between the direct current input power supply and the inverter circuit for controlling voltage between two power ends of a switching device of the inverter circuit;
   the primary transmitting part comprising a primary transmitting coil, the primary transmitting coil being used for receiving the alternating voltage to generate an alternating magnetic field to transmit energy to the electrical energy receiving end;
   wherein the soft-switching control circuit controls the voltage between the two power ends of the switching device of the inverter circuit, during disconnection of the switching device, a voltage waveform between the two power ends of the switching device is a waveform in a form of a fundamental wave superimposed with a third harmonic, such that when the switching device is connected, the voltage between the two power ends of the switching device is lowered to zero;
   wherein the inverter circuit comprises a field effect transistor, the field effect transistor is controlled by a clock signal to be in an open state or a closed state, when the clock signal is in an effective state, the field effect transistor is connected, when the clock signal is in a null state, the field effect transistor is disconnected, and
   wherein the soft-switching control circuit comprises a first inductance, a second inductance, a first capacitor, and a third capacitor;
   wherein the first inductance is connected between one end of the direct current input power source and one of the power ends of the switching device of the inverter circuit;
   wherein the second inductance is connected with the first capacitor in series and then connected with the first inductance in parallel;
   wherein the third capacitor is connected with two ends of the first inductance in parallel.

9. The high-efficiency electrical energy transmitting end as claimed in claim 8, wherein the first inductance, the second inductance, the first capacitor, and the third capacitor are integrated into a module.

* * * * *